United States Patent [19]

Urushihara et al.

[11] 4,327,985
[45] May 4, 1982

[54] BATTERY-VOLTAGE INDICATOR OF CAMERA

[75] Inventors: Kazunobu Urushihara, Inagi; Masanori Uchidoi, Yokohama, both of Japan

[73] Assignee: Canon Kabushiki Kaisha, Tokyo, Japan

[21] Appl. No.: 215,645

[22] Filed: Dec. 12, 1980

[30] Foreign Application Priority Data

Dec. 13, 1979 [JP] Japan ................................ 54-161869

[51] Int. Cl.³ ............................................. G03B 17/00
[52] U.S. Cl. .................................. 354/289; 354/23 D
[58] Field of Search ............... 354/23 D, 60 R, 60 A, 354/60 E, 60 L, 289

[56] References Cited

U.S. PATENT DOCUMENTS

| | | | |
|---|---|---|---|
| 4,114,176 | 9/1978 | Kawasaki | 354/289 |
| 4,258,999 | 3/1981 | Tominaga | 354/289 |
| 4,269,494 | 5/1981 | Shiozawa et al. | 354/289 |
| 4,270,852 | 6/1981 | Suzuki et al. | 354/289 |

FOREIGN PATENT DOCUMENTS

2846919  5/1979  Fed. Rep. of Germany ...... 354/289

*Primary Examiner*—Russell E. Adams
*Attorney, Agent, or Firm*—Toren, McGeady & Stanger

[57] ABSTRACT

In a voltage indicator of a camera, the voltage value of the battery is converted into digital value through analog-to-digital conversion processing. Such digital signals are digitally expanded by converting equal difference variations thereof into equal ratio variations thereof. The digitally expanded signals are adapted to vary in accordance with variations of the battery voltage. Thus, the expanded digital signals energize an alarm to audibly indicate the value of the battery voltage.

16 Claims, 6 Drawing Figures

FIG.2(a)

| V Bat | CNT3 | | | | | | |
|---|---|---|---|---|---|---|---|
| | 1 | 2 | 4 | 8 | 16 | 32 | 64 |
| 0.1 OR LESS | 0 OR 1 | 0 OR 1 | 0 OR 1 | 0 | 0 | 0 | 0 |
| 0.2 | 0 | 0 | 0 | 1 | 0 | 0 | 0 |
| 0.3 | 0 | 0 | 0 | 0 | 1 | 0 | 0 |
| 0.4 | 0 | 0 | 0 | 1 | 1 | 0 | 0 |
| 0.5 | 0 | 0 | 0 | 0 | 0 | 1 | 0 |
| 0.6 | 0 | 0 | 0 | 1 | 0 | 1 | 0 |
| 0.7 | 0 | 0 | 0 | 0 | 1 | 1 | 0 |
| 0.8 | 0 | 0 | 0 | 1 | 1 | 1 | 0 |
| 0.9 | 0 | 0 | 0 | 0 | 0 | 0 | 1 |
| 1 | 0 | 0 | 0 | 1 | 0 | 0 | 1 |
| 1.1 | 0 | 0 | 0 | 0 | 1 | 0 | 1 |
| 1.2 | 0 | 0 | 0 | 1 | 1 | 0 | 1 |
| 1.3 | 0 | 0 | 0 | 0 | 0 | 1 | 1 |
| 1.4 | 0 | 0 | 0 | 1 | 0 | 1 | 1 |
| 1.5 | 0 | 0 | 0 | 0 | 1 | 1 | 1 |
| 1.6 | 0 | 0 | 0 | 1 | 1 | 1 | 1 |

| V Bat | 1 | L1 2 | 4 | 8 | DEC | GATE | PULSE PERIOD |
|---|---|---|---|---|---|---|---|
| 0.1 OR LESS | 0 | 0 | 0 | 0 | 0 | $N_0$ | $2T_1$ |
| 0.2 | 1 | 0 | 0 | 0 | 1 | $N_1$ | $2^2T_1$ |
| 0.3 | 0 | 1 | 0 | 0 | 2 | $N_2$ | $2^3T_1$ |
| 0.4 | 1 | 1 | 0 | 0 | 3 | $N_3$ | $2^4T_1$ |
| 0.5 | 0 | 0 | 1 | 0 | 4 | $N_4$ | $2^5T_1$ |
| 0.6 | 1 | 0 | 1 | 0 | 5 | $N_5$ | $2^6T_1$ |
| 0.7 | 0 | 1 | 1 | 0 | 6 | $N_6$ | $2^7T_1$ |
| 0.8 | 1 | 1 | 1 | 0 | 7 | $N_7$ | $2^8T_1$ |
| 0.9 | 0 | 0 | 0 | 1 | 8 | $N_8$ | $2^9T_1$ |
| 1 | 1 | 0 | 0 | 1 | 9 | $N_9$ | $2^{10}T_1$ |
| 1.1 | 0 | 1 | 0 | 1 | 10 | $N_{10}$ | $2^{11}T_1$ |
| 1.2 | 1 | 1 | 0 | 1 | 11 | $N_{11}$ | $2^{12}T_1$ |
| 1.3 | 0 | 0 | 1 | 1 | 12 | $N_{12}$ | $2^{13}T_1$ |
| 1.4 | 1 | 0 | 1 | 1 | 13 | $N_{13}$ | $2^{14}T_1$ |
| 1.5 | 0 | 1 | 1 | 1 | 14 | $N_{14}$ | $2^{15}T_1$ |
| 1.6 | 1 | 1 | 1 | 1 | 15 | $N_{15}$ | $2^{16}T_1$ |

FIG.5

| Tv | L1 | | | | | | | DEC | GATE | PULSE PERIOD | EXPOSURE TIME |
|---|---|---|---|---|---|---|---|---|---|---|---|
| | 8 | 4 | 2 | 1 | $\frac{1}{2}$ | $\frac{1}{4}$ | $\frac{1}{8}$ | | | | |
| 10 | 0 | 0 | 0 | 0 | 0 | 0 | 0 | 0 | N$_0$ | 2T$_1$ | 8×2T$_1$ |
| 9 | 0 | 0 | 0 | 1 | 0 | 0 | 0 | 1 | N$_1$ | $2^2$T$_1$ | 8×$2^2$T$_1$ |
| 8 | 0 | 0 | 1 | 0 | 0 | 0 | 0 | 2 | N$_2$ | $2^3$T$_1$ | 8×$2^3$T$_1$ |
| 7 | 0 | 0 | 1 | 1 | 0 | 0 | 0 | 3 | N$_3$ | $2^4$T$_1$ | 8×$2^4$T$_1$ |
| 6 | 0 | 1 | 0 | 0 | 0 | 0 | 0 | 4 | N$_4$ | $2^5$T$_1$ | 8×$2^5$T$_1$ |
| 5 | 0 | 1 | 0 | 1 | 0 | 0 | 0 | 5 | N$_5$ | $2^6$T$_1$ | 8×$2^6$T$_1$ |
| 4 | 0 | 1 | 1 | 0 | 0 | 0 | 0 | 6 | N$_6$ | $2^7$T$_1$ | 8×$2^7$T$_1$ |
| 3 | 0 | 1 | 1 | 1 | 0 | 0 | 0 | 7 | N$_7$ | $2^8$T$_1$ | 8×$2^8$T$_1$ |
| 2 | 1 | 0 | 0 | 0 | 0 | 0 | 0 | 8 | N$_8$ | $2^9$T$_1$ | 8×$2^9$T$_1$ |
| 1.875 | 1 | 0 | 0 | 0 | 0 | 0 | 1 | 8 | N$_8$ | $2^9$T$_1$ | 9×$2^9$T$_1$ |
| 1.75 | 1 | 0 | 0 | 0 | 0 | 1 | 0 | 8 | N$_8$ | $2^9$T$_1$ | 10×$2^9$T$_1$ |
| 1.625 | 1 | 0 | 0 | 0 | 0 | 1 | 1 | 8 | N$_8$ | $2^9$T$_1$ | 11×$2^9$T$_1$ |
| 1.5 | 1 | 0 | 0 | 0 | 1 | 0 | 0 | 8 | N$_8$ | $2^9$T$_1$ | 12×$2^9$T$_1$ |
| 1.375 | 1 | 0 | 0 | 0 | 1 | 0 | 1 | 8 | N$_8$ | $2^9$T$_1$ | 13×$2^9$T$_1$ |
| 1.25 | 1 | 0 | 0 | 0 | 1 | 1 | 0 | 8 | N$_8$ | $2^9$T$_1$ | 14×$2^9$T$_1$ |
| 1.125 | 1 | 0 | 0 | 0 | 1 | 1 | 1 | 8 | N$_8$ | $2^9$T$_1$ | 15×$2^9$T$_1$ |
| 1 | 1 | 0 | 0 | 1 | 0 | 0 | 0 | 9 | N$_9$ | $2^{10}$T$_1$ | 8×$2^{10}$T$_1$ |
| 0.875 | 1 | 0 | 0 | 1 | 0 | 0 | 1 | 9 | N$_9$ | $2^{10}$T$_1$ | 9×$2^{10}$T$_1$ |
| 0.75 | 1 | 0 | 0 | 1 | 0 | 1 | 0 | 9 | N$_9$ | $2^{10}$T$_1$ | 10×$2^{10}$T$_1$ |

BATTERY-VOLTAGE INDICATOR OF CAMERA

BACKGROUND OF THE INVENTION

1. Field of the Invention

This invention relates to a voltage indicator for the battery in a camera.

2. Description of the Prior Art

It is known in the prior art to provide a battery checker in such form that the battery voltage is converted to the corresponding frequency of pulses by which the indicating means, such as an LED, is driven to light on an off, thereby the battery voltage is indicated by the lighting-on and lighting-off period. However, this method, because it uses the direct V-f conversion of the battery voltage which varies the lighting-on and lighting-off period linearly with the battery voltage, cannot clearly indicate a fine variation of the battery voltage. To solve this problem, use may be made of, for example, an analog expanding circuit so that the battery voltage, after having been expanded, is subjected to the V-f conversion with the advantage that the range of variation of the lighting-on and lighting-off period for the fine variation of the battery voltage is increased. However, this alternate method has a disadvantage, which arises from the use of such analog expanding circuit that the expanding characteristics of the circuit components necessary to analogically expand the battery voltage itself are largely influenced by temperature and therefore the expanding operation cannot be performed with high precision.

SUMMARY OF THE INVENTION

It is, accordingly, an object of the present invention to provide an improved battery-voltage indicator of a camera which obviates the disadvantages of prior art devices.

It is another object of the invention to provide a battery-voltage indicator of a camera, wherein the battery voltage is subjected to an analog-to-digital conversion; then the analog-digital conversion output is subjected to digital expansion by a digital expanding circuit, and then the expansion output is used in driving the indicating element.

These and further objects and features of the invention will become apparent from the following detailed description of embodiments thereof taken in connection with the accompanying drawings.

BRIEF DESCRIPTION OF THE DRAWINGS

FIG. 2(a) is a table showing the relationship of the battery voltage with the output of the counter CNT2 of FIG. 1.

FIG. 5 is a table showing a manner in which the circuit of FIG. 4 operates.

DESCRIPTION OF THE PREFERRED EMBODIMENTS

Figure 1:
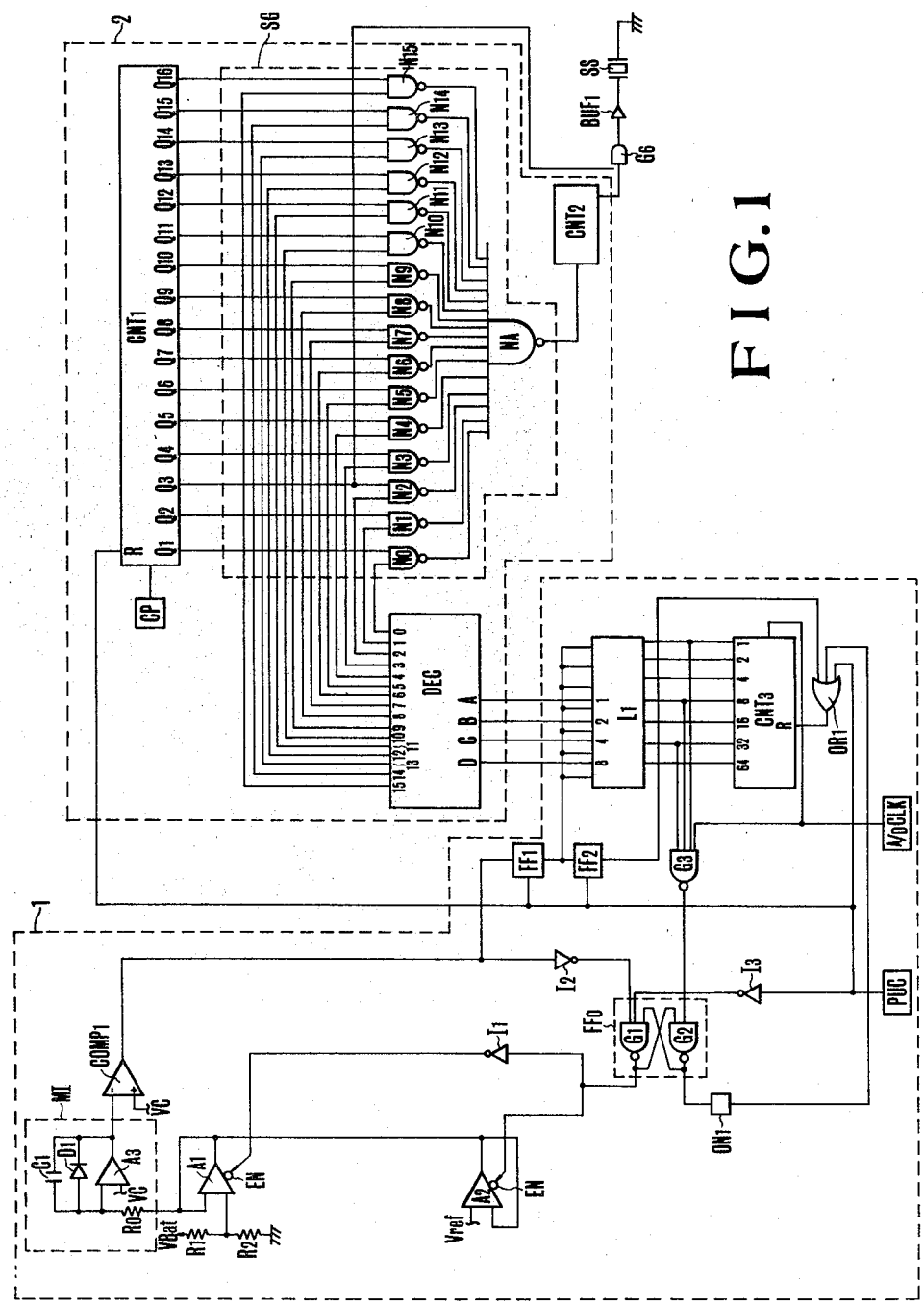
FIG. 1 is a circuit diagram of one embodiment of a battery checker according to the present invention.

In FIG. 1, a circuit portion enclosed within a dashed line block 1 is an analog-digital converter for converting the battery voltage value in the analog form to a digital value. In this converter, the battery voltage is integrated by a Miller integrator for a predetermined certain time, then after the elapse of that certain time, a further integration is performed by the same Miller integrator reversely of the reference voltage, while the number of pulses occurring during the time of the reverse integrating operation depending upon the actual value of the battery voltage is counted by a counter to obtain a digital value corresponding to the battery voltage value. This shows a so-called dual-slope integrator A/D converter.

In this converter, R1, R2 are bleeder resistances across which the battery voltage VBat to be checked is applied. The battery voltage divided by these bleeder resistances is applied through a buffer amplifier A1 to a Miller integrator MI comprising an amplifier A3, a capacitor Cl, a resistor Ro and a diode D1. A2 is a buffer amplifier to which is applied a reference voltage Vref for variation of the battery voltage. The output of the amplifier is applied to the Miller integrator circuit MI. Both buffer amplifiers A1 and A2 have enable terminals EN for controlling the operation and inoperation of said both buffer amplifiers. The output of the Miller integrator is applied to the opposite input terminal (−) of a comparator COMP1 to that (+) to which the reference voltage Vc is applied. CNT3 is a 7-bit binary counter, said counter having a timer function such that the pulses from a clock pulse oscillator A/D CLK are counted, so that the output of the amplifier A1 is transmitted to the Miller integrator for a predetermined certain time, and having a counting function of counting the pulses when in the analog-digital conversion. This 7-bit binary counter CNT3 has output terminals for producing the counted values 1, 2, 4, 8, 16, 32 and 64 respectively and a reset terminal R connected to an OR gate OR1. FFo is a flip-flop consisting of NAND gates G1 and G2 and constituting a changeover circuit operating in such a manner that during the predetermined time depending on the counted values 1, 8 and 32 from the three of the outputs of the binary counter CNT3 and the counted value 0.5 of the clock pulse oscillator A/D CLK, the output of the amplifier A1 is allowed to enter the Miller integrator MI, and after the elapse of that predetermined time the output of the amplifier A2 is then allowed to enter the Miller integrator MI. $I_1$ is an inverter giving the inverted output of the NAND gate G1 in the flip-flop FFo to the enable terminal EN of the amplifier A1. FF1 and FF2 are flip-flops having functions of latching the content of the counter CNT3 in a latch circuit $L_1$ in response to the output of the comparator COMP1 and resetting the counter CNT3 through the OR gate OR1. The reset terminals of these flip-flops FF1 and FF2 are connected to a power-up clear circuit PUC. The power-up clear circuit PUC is arranged to produce a power-up clear pulse when a battery check button mounted on a camera body or the like is pushed down to turn on a battery check switch (not shown). This circuit PUC is further connected through an inverter I3 to the flip-flop FFo and through the OR gate OR1 to the reset terminal R of the binary counter CNT3. ON1 is a one-shot circuit connected between the output terminal of the NAND gate G2 in the FFo and the input interminal of the OR gate OR1 and adapted to reset the binary counter CNT3 as it is responsive to the output of the NAND gate G2 for supplying a one-shot pulse through the OR gate OR1 to the reset terminal R of the binary counter CNT3.

A circuit portion 2 enclosed within a dashed line block represents a digital expanding circuit. The expanding circuit has, on the basis of the above-described analog-digital conversion, to select pulses of the frequency changing in 2 times progressions so that the arithmetical change of the digital value is converted to the geometric change of the frequency, thus effecting the digital expansion. In this circuit 2, DEC is a decoder having input terminals A to D which are connected to the output terminals 1 to 8 of the latch circuit L1. It is noted that the output terminals 1 to 8 of this latch circuit correspond to the four higher output terminals 8 to 64 of the above-described 7-bit binary counter. The decoder produces a signal of high level (hereinafter referred to as "1" signal) at one of the output terminals thereof depending upon the digital value appearing at the input terminals A–D thereof. SG is a selection gate consisting of NAND gates N0 to N15 and NA. The NAND gate N0 constituting part of the said selection gate has one input which is connected to the output 0 of the decoder DEC, the opposite input of which is connected to an output terminal Q1 of a frequency divider CNT1 consisting of binary counters to be described more fully later. Responsive to the "1" signal from the output terminal 0 of the decoder DEC, the frequency divider CNT1 produces a pulse at the output terminal Q1. Also the NAND gates N1 to N15 have input terminals which are connected to respective output terminals of the decoder DEC and respective output terminals of the frequency divider CNT1 in a manner similar to the NAND gate N0, and select one of the output terminals of the frequency divider CNT1 for production of a pulse depending upon the output of the decoder. The above-described frequency divider CNT1 receives a clock pulse train of period T1 from a clock pulse generator CP and produces pulses of periods $2^2T1$, $2^3T1$, $2^4T1$, $2^5T1$, $2^6T1$, $2^7T1$, $2^8T1$, $2^9T1$, $2^{10}T1$, $2^{11}T1$, $2^{12}T1$, $2^{13}T1$, $2^{14}T1$, $2^{15}T1$ and $2^{16}T1$ at the output terminals Q1 to Q16 thereof respectively. CNT2 is a 4-bit frequency divider of binary counters, said frequency divider multiplying the period of the output pulse from the selection gate by 16 before it enters an AND gate G6. Connected to said AND gate G6 is the output terminal Q3 of the above-described frequency divider. That is, this output terminal Q3 gives the audible waveform of pulses having the period of $2^3T1$, and this is AND-combined with the output pulse having a relatively long period from the 4-bit frequency divider. Therefore, the AND gate G6 produces a sound signal in such form that the audible frequency pulse train interrupted by the pulse train of the relatively long period. This sound signal is applied through a buffer amplifier BuFl to drive a sound source.

Figures 2B, 3:
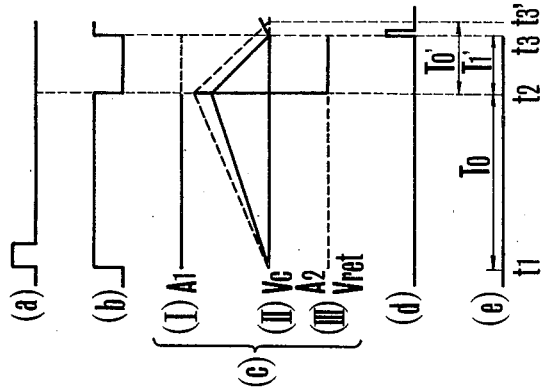
FIG. 2(b) is a table showing a manner in which the expanding circuit of FIG. 1 operates.
FIG. 3 depicts waveforms showing a manner in which the analog-digital converter of FIG. 1 operates.

The operation of said FIG. 1 embodiment will next be described by reference to FIGS. 1 to 3. Now, the check switch (not shown) is turned on at a point in time t1, causing the power-up clear circuit PUC to produce a power-up clear pulse (FIG. 3(a)) by which the flip-flops FF1 and FF2 and counter CNT3 and frequency divider CNT1 are reset. Also, said clear pulse is applied through the inverter I3 to the NAND gate in the flip-flop FF0, and the NAND gate G1 produces a "1" signal as shown in FIG. 3(b). Since, on the other hand, the counter CNT3 has been reset, the NAND gate G3 produces a "1" signal. Then, the 37 "1" signal from said gate G3 and the "1" signal from the gate G1 enter the gate G2. Therefore, the gate G2 produces a signal of low level (hereinafter referred to as "0" signal) by which the gate G1 is caused to retain a "1" signal, thus determining the condition of the flip-flop $FF_0$. Then, the "1" signal from the gate G1 after having been changed to a "0" signal by the inverter $I_1$ is applied to the enable terminal EN of the amplifier A1, thereby the amplifier A1 is rendered operative. Since the output of the amplifier is applied to the input terminal of the Miller integrator, the Miller integrator starts to integrate the output of the amplifier A1 as shown in FIGS. 3(c) (I) and (II). Since, on the other hand, the counter CNT3 after having been reset by the power-up clear pulse has been counting the pulses from the pulse oscillator A/D CLK, when the number of pulses counted reaches 41, the outputs at the terminals 1, 8 and 32 of the counter CNT3 simultaneously become "1". That is, at a point in time t2 after the predetermined time interval from the time point t1 to the moment at which the counter CNT3 counts 41 pulses and the oscillator A/D CLK produces a "1" signal, or the time interval $T_0$ determined by the counted value 41.5 (FIG. 3(e)), the inputs of the NAND gate G3 are all of "1" signal. At the time point t2, therefore, the NAND gate G3 produces "0" signal which is then applied to the NAND gate G2 at one input thereof, causing the gate G2 to produce a "1" signal. Since the output terminal of the gate G2 is connected to one of the input terminals of the NAND gate G1, and the other input terminals of the gate G1 are connected through the respective inverters I2 and I3 to the comparator COMP1 and power-up clear circuit PUC respectively, and since it is at the time point t2 that the power-up clear circuit and comparator produce "0" signals as shown in FIGS. 3(a) and (d), the gate G1 responsive to the "1" signal of the gate G2 produces a "0" signal at the time point t2. Therefore, the "1" signal is transmitted through the inverter $I_1$ to the enable terminal EN of the amplifier A1, thereby the amplifier A1 is rendered inoperative (FIG. 3(c) (I)), thus terminating the integrating operation by the Miller integrator circuit MI at the time point t2. In short, the output of the amplifier A1 is integrated during the certain time interval from the time point t1 to t2 (FIG. 3(c) (II)). The termination of duration of an integrating operation for the output of the amplifier A1 at the time point t2 is then followed by initiation of a reverse integration for the output of the amplifier A2. That is, since the gate G1 changes its output signal to "0" at the time point t2, the enable terminal EN of the amplifier A2 is fed with that "0" signal and this continues from the time point t2 onwards. Therefore, after the time point t2, the amplifier A2 is in operation (FIG. 3(c) (III)) with its output entering the Miller integrator MI. Since the output of the amplifier A2 corresponds to the reference voltage Vref, and the Vref is set to be a potential of opposite polarity to the output of the amplifier A1 with respect to the voltage Vc as the standard as shown in FIG. 3(c) (III), the Miller integrator reversely integrates the output of the amplifier A2 after the time point t2 as shown in FIGS. 3(c) (II) and (III). Also, since on the other hand as shown in the above, the gate G2 changes its output signal to "1" at the time point t2, the one-shot circuit ON1 is actuated at the time point t2 to produce a pulse which is then applied through the OR gate OR1 to the counter CNT3, thereby the counter CNT3 is reset at the time point t2. Therefore, in synchronism with the start of a reverse integrating operation at the time point t2, the counter CNT3 starts from the initial condition to count the pulses from the clock pulse oscillator A/D CLK. After the start of the reverse integrating operation of the Miller integrator and of the counting operation of the counter, the output of the Miller integrator begins to lower as shown in FIG. 3(c) (II). Then, when the output of the Miller integrator MI reaches the reference voltage Vc, or at the time point t3, the output of the comparator COMP1 is inverted as shown in FIG. 3(d), becoming a "1". The "1" signal from the comparator COMP 1 is applied to the flip-flop FF1 and the flip-flop FF1 is set with its set output actuating the latch circuit L1, thereby the counted value by the counter CNT3 is latched, and a digital value corresponding to the battery voltage VBat is memorized in the latch circuit. In summary, the integrating operation for the output of the amplifier A1 by the Miller integrator is performed for a predetermined time $T_0$, and the output of the amplifier A1 corresponds to the battery voltage VBat, so that the output level of the Miller integrator at the time point t2 represents a value corresponding to the battery voltage. Then, the reverse integrating operation is performed on the basis of the output of the amplifier A2, that is, the reference voltage Vref, so that the output of the Miller integrator decreases at a predetermined slope as the reverse integration proceeds. Therefore, in the case while the reverse integrating operation takes a different course shown by a dashed line in FIG. 3(c) (II) for example, the time interval $T_0'$ during which the output of the Miller integrator reaches the reference voltage Vc is made to correspond to a different value of the battery voltage from that shown in FIG. 3(c) (I). The counted value by the counter CNT3 in said time interval $T_0'$ is latched in the latch circuit L1 so that what is memorized in the latch circuit L1 is a digital value corresponding to the battery voltage VBat.

FIG. 2(a) shows the relation of variation of the battery voltage with digital values resulting from the analog-digital conversion of said voltage variation. It is noted here that each time the battery voltage changes by 0.1 volt, the counted value of the counter CNT3 is caused to change. For example, when the battery voltage is 1.5 volts, the corresponding digital value is "0000111", and this is memorized in the latch circuit as has been mentioned before.

Then, when the digital value corresponding to the battery voltage VBat is memorized in the latch circuit L1 in such a manner, the decoder DEC responsive to the output of the latch circuit L1 produces a "1" signal at the corresponding one of the output terminals thereof, thereby the corresponding one of the NAND gates is selected for application of its output to the frequency divider CNT2 where its period is multiplied by 16. Then, the output of the frequency divider CNT2 is applied to the AND gate G6. Also applied to this AND gate G6 is the pulse train of audible frequency from the output terminal Q3 of the frequency divider CNT1. Therefore, the AND gate G6 intermittently passes the output of the frequency divider CNT1 therethrough in a period determined by the output of the frequency divider CNT2, while such output of the AND gate G6 is applied to drive the sound source SS, thus indicating the actual value of battery voltage in the form of the sound period.

The relation between the output of the latch circuit L1 and the output of the decoder DEC, the relation between the output of the decoder DEC and the selected gate, the relation between the selected gate and the period of the output pulses from the selected gate, and the relation between the battery voltage and the output of the latch L1 are shown in FIG. 2(b). That is, assuming that the battery voltage VBat is below 0.1 volt, then the analog-digital converted value counted by the counter CNT3 is "0000000", or 1110000" as shown in FIG. 2(a). Therefore, the output of the latch circuit L1 is "0000" as shown in FIG. 2(b), so that it is at the output terminal 0 that the decoder DEC produces "1" signal. This "1" signal is applied to the NAND gate $N_0$. Therefore, the NAND gate $N_0$ is selected for application of the output pulse from the terminal Q1 of the frequency divider CNT1 to the frequency divider CNT2 through the NAND gate NA. Since said frequency divider CNT1 divides the frequency of the pulse of the period T1 as has been mentioned before, the period 2T1 of the output pulse from the output terminal Q1 is increased to $2^5T1$ by the frequency divider CNT2. Thus, the sound cource SS is driven to operate with the period corresponding to the pulse of the said period $2^5T1$.

Alternately, assuming that the battery voltage VBat is 0.2 volts, then the analog-digital converted value is "0001000" as shown in FIG. 2(a), so that it is at the output terminal 1 that the decoder DEC produces, "1" signal. Because of this, the NAND gate N1 is selected, and on the basis of the period of the output pulses from the output terminal Q2 of the frequency divider to which the said gate N1 is connected, the sound source is driven to operate. Since the output at the terminal Q2 is the pulses of the period $2^2T1$, it is in this case that the sound source is driven to operate in the period of $2^6T1$ through the frequency divider CNT2.

Thus, each time the battery voltage changes 0.1 volt, the output pulses from the selection gate SG is caused to change in geometric progression as shown in FIG. 2, determining the period of actuation of the sound source. It will be appreciated that according to the present invention, the arithmetical change of the battery voltage in a unit of 0.1 volt is translated to the geometical change of the frequency at which the sound source is driven to operate with the advantage that even a minute change of the battery voltage can be indicated distinctively as the period of actuation of the sound source is largely changed.

Figure 4:
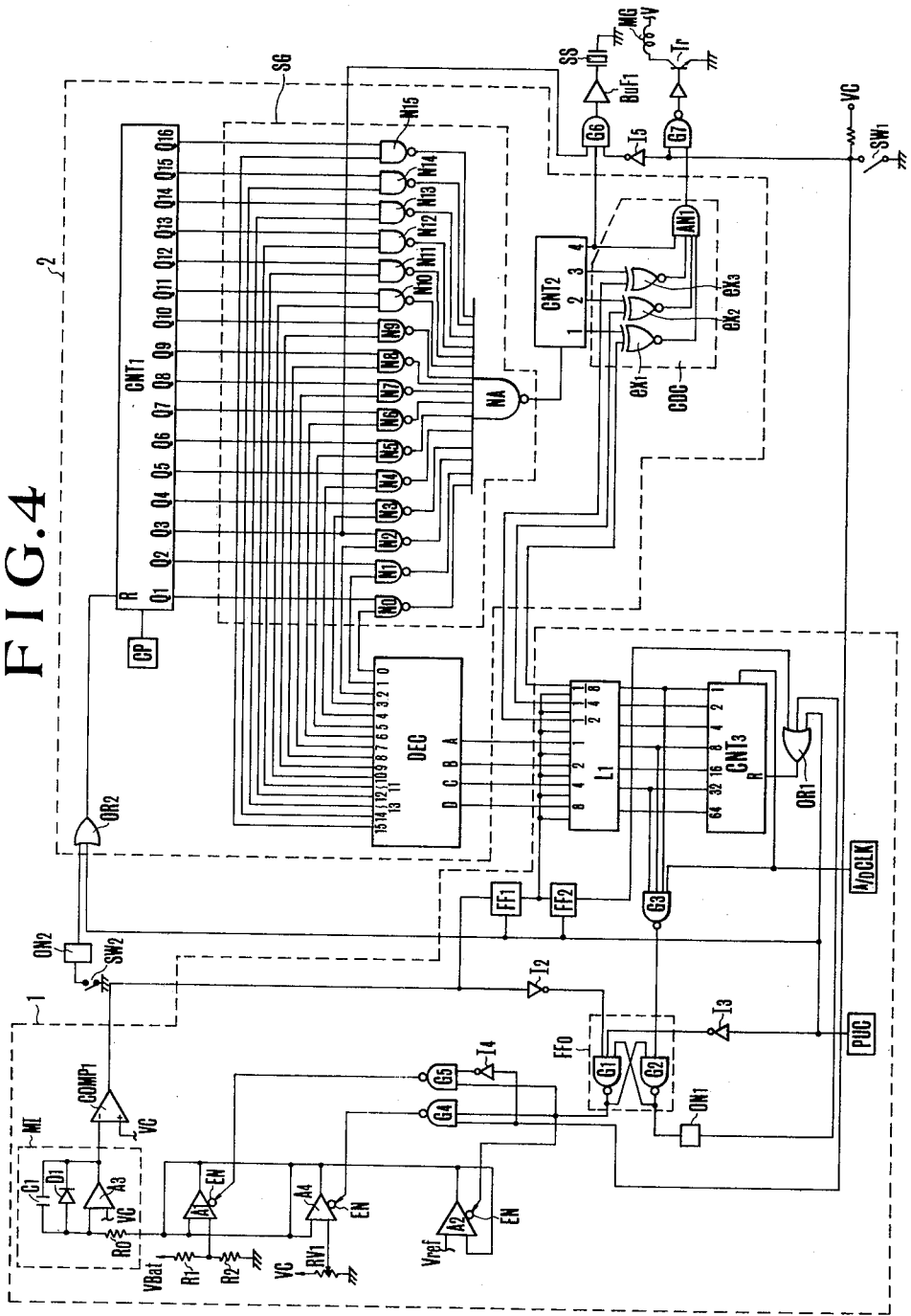
FIG. 4 is a circuit diagram of another embodiment of a battery checker according to the present invention.

FIG. 4 is an electrical circuit diagram showing an example of application of the battery checker of the invention to an electronic shutter circuit for the camera. In FIG. 4, the same reference characters have been employed to denote the similar parts to those shown in FIG. 1. In the circuit of FIG. 4, RV1 is a variable resistor having a resistance value related to the preset value of shutter time in cooperation with a shutter dial (not shown); A4 is a buffer amplifier having an input which is connected to the output of the variable resistor RV1, said amplifier A4 producing an output representative of the apex value Tv for the preset value of shutter time. G4, G5, I4 and NAND gates and an inverter constituting a mode selection gate. When the battery check mode is selected by a mode selection switch SW1, the gate G4 produces, "1" signal, rendering inoperative the amplifier A4. When the exposure control mode is selected, the gate G5 produces, "1" signal, rendering inoperative the amplifier A1. G6, G7, I5 are an AND gate, a NAND gate and an inverter constituting a second selection gate. When the battery check mode is selected by the switch SW1, the gate G7 is caused to produce, "1" signal regardless of the output of a coincidence circuit CDC to be described more fully later, thereby a transistor Tr is maintained in an ON state and a shutter trailing curtain latching magnet MG is held in an operative state. SW2 is a count switch arranged to be turned on when a shutter leading curtain runs down; ON2 is a one-shot circuit. The coincidence circuit CDC is comprised of exclusive NOR gates ex1 to ex3 and an AND gate AN1. The FIG. 4 embodiment utilizes the expanding circuit for exposure control in also serving as the expanding circuit of FIG. 1. Thus, without the provision of a particular expanding circuit adapted for use in the battery checker, a checker circuit of the equivalent function to that in FIG. 1 can be established.

The operation of the circuit of FIG. 4 is as follows.

First explanation is given to the exposure control mode. In this case, the mode selection switch SW1 is required to be turned off. This causes the inverter I4 to produce a "0" signal and therefore the gate G5 to produce "1" signal regardless of the condition of the flip-flop $FF_0$. Said "1" signal is given to the enable terminal EN of the amplifier A1. In the case of the exposure control mode, therefore, the amplifier A1 is rendered inoperative. Then, when a shutter button (not shown) is depressed to a first stroke, the power-up clear circuit PUC is rendered operative. Then, the operation described in connection with FIG. 1 proceeds to perform the analog-digital conversion. In this case, as has been mentioned above, the amplifier A1 is in the inoperative condition, and the production of a "1" signal from the gate G1 in the flip-flop $FF_0$ causes production of "0" signal from the NAND gate G4. Therefore, instead of the output of the amplifier A1, the output of the amplifier A4 is applied to the Miller integrator by which the output of the said amplifier A4 is converted to a digital value. Further since, as has been mentioned above, the output of the amplifier A4 corresponds to the shutter time value, or the Tv value, the above-described analog-digital conversion results in latching a digital value corresponding to the Tv value in the latch circuit L1.

Now assuming that the Tv value is related to the digital value in such the fashion as shown in FIG. 5, then the above-described analog-digital conversion process results in the storage of the corresponding digital value to the Tv value in the latch circuit L1 according to the table of FIG. 5.

Upon further depression of the shutter button to the second stroke, a leading curtain of the shutter (not shown) starts to run down, initiating an exposure. Such movement of the leading curtain causes the switch SW2 to be turned on and therefore actuation of the one-shot circuit ON2. Then, a pulse is applied through the OR gate OR2 to the frequency divider CNT1 at the reset terminal R thereof. After the frequency divider is reset to the initial state, the clock pulses starts to be counted.

Since, on the other hand, the Tv value in the form of the digital value is latched in the latch circuit L1, the one of the NAND gates in the selection gates which corresponds to the digital value latched is selected in a manner similar to that described in connection with the FIG. 1 embodiment. Then, the pulse train from the corresponding one of the outputs of the frequency divider CNT1 are selected for application to the counter CNT2 through the selection gate SG. Since, the relation between the content of the latch circuit L1 and the selected NAND gate with the output pulse is the same as in the case of FIG. 1 embodiment, no more further explanation is given here, except that the relation between the content of the latch circuit and the output pulse is shown in FIG. 5. Therefore, change of the Tv value in every one step is followed by change of the period of the output pulse in multiple proportion, thus elongating the shutter time when the exposure time is controlled. That is, when the Tv value is, for example, 10, the selection gate SG produces pulses of the period 2T1 as shown in FIG. 5, which are applied to the counter CNT2. When eight pulses are counted, the counter CNT2 produces a "1" signal from the output terminal 4 thereof. Again, since the Tv value is 10, a "0" signal appears at each of the output terminals $\frac{1}{2}$, $\frac{1}{4}$ and $\frac{1}{8}$ of the latch circuit L1 so that the exclusive NOR gates ex1 to ex3 produce "1" signals when the counter CNT2 counts eight pulses. Therefore, responsive to the "1" signal from the output terminal 4 of the counter CNT2, the AND gate AN1 produces "1" signal which is then applied to the NAND gate G7 at one input thereof. Since the other input terminal of the said NAND gate G7 is connected to the switch SW1, and since said switch has been OFF as mentioned above, the NAND gate G7 responsive to "1" signal from the AND gate AN1 produces a "0" signal, causing the transistor Tr to be turned off and therefore the magnet MG to be deenergized. Then, a trailing curtain of the shutter is released from the latching connection, terminating the exposure. It is noted that when the Tv is 10, the film is exposed for a time necessary to count eight pulses of the period of 2T1, and therefore that the shutter time is made equal to $8 \times 2T1$. Otherwise when the Tv value is 9, a similar control of the exposure time leads to create a shutter time of $8 \times 2^2 T1$, since, in this case, the pulses from the selection gate SG have a period of $2^2 T1$ as shown in FIG. 5. Likewise as the Tv value decreases one step, the shutter time is doubled. Thus, the shutter time is elongated on the basis of the Tv value. It is noted that the reason why the said embodiment provides for the latch circuit L1 with the output terminals $\frac{1}{2}$, $\frac{1}{4}$ and $\frac{1}{8}$ connected to the coincidence circuit CDC is to control the shutter time with an accuracy up to $\frac{1}{8}$ of Tv unit. But this is not directly related to the present invention, and, therefore, a more detailed explanation is omitted here.

Next explanation is given to the battery check mode. In this case, the operator needs to turn on the switch SW1. Then, the NAND gate G7 produces a "1" signal regardless of the output of the coincidence circuit and the transistor Tr is rendered conducting and maintained in this state, so that the magnet is maintained energized. On the other hand, since the AND gate G6 is fed at its one input with a "1" signal through the inverter I5, said gate G6 is rendered responsive to the signal from the output terminal 4 of the counter CNT2. And since the NAND gate G4 is also fed with a "0" signal from the closed switch SW1, the gate G4 produces a "1" signal which is then applied to the enable terminal EN of the amplifier A4 so that said amplifier A4 is rendered inoperative. On the other hand, since one input of the gate G5 is fed with a "1" signal through the inverter I4, the gate G5 is rendered responsive to the output of the flip-flop $FF_0$. Then, responsive to a "1" signal from the gate G1 in the flip-flop $FF_0$, said gate G5 produces a "0" signal which is then applied to the enable terminal EN of the amplifier A1. When in the battery check mode, therefore, instead of the output of the amplifier A4, the output of the amplifier A1, that is the battery voltage VBat is allowed to enter the Miller integrator. Therefore, the closure of the check switch (not shown) is followed by actuation of the power-up clear circuit PUC and then by the start of the analog-digital conversion process as has been mentioned above. In a manner similar to that described in greater detail in connection with the FIG. 1 embodiment, a latching of the digital value corresponding to the battery voltage in the latch circuit L1 is performed. In a manner similar to that described in connection with the FIG. 1 embodiment, arithmetical change of the battery voltage is converted to geometrical change of the period by the expanding circuit 2, and said period is further expanded through the frequency divider CNT2. Then this expanded period is used in driving the sound source SS. Thus, the battery checking operation is completed. It will be appreciated that said FIG. 4 embodiment applies the expanding circuit of the electronic shutter circuit as the expanding circuit usable in the battery checker of the invention, so that the circuitry of the electronic shutter can be utilized without further modification in performing the expanding operation of the battery voltage, thereby it being made possible for the battery checker to have an extremely simple structure.

It will be seen from the foregoing that in the battery checker according to the present invention, the battery voltage is converted to a digital value, then said converted digital value is expanded by the digital expanding circuit, and then the indicating operation is carried out on the basis of the said expanded output, thereby giving great advantages that a distinctive indication can be presented even for minute variation of the battery voltage, and that, since for such expanding circuit use can be made of a digital expanding circuit, the accuracy of voltage measurement can be improved over the analog expansion type battery checker.

It should be pointed out that the presentation of the indication is not necessarily in the form of sound but may be performed by the use of LEDs or the like provided that the expanded period signal only is used. It should be further pointed out that the sound source takes the form of a direct current driven buzzer, it is not necessary to use the audible frequency signal, but the expanded period signal only may be used.

What is claimed is:

1. A battery-voltage indicator of a camera comprising:
    a battery, the voltage of which is to be checked;
    said battery for being employed as the power source of circuitry means necessary for the photographing operation;
    an analog-to-digital converter for changing the analog value of a battery voltage into digital signal;
    said analog-to-digital converter including an integrator being connected to said battery and counter means for counting digital value on operation of the integrator, in accordance with the voltage value of the battery;
    an expanding circuit for enlarging the period of the digital output of said converter, wherein said expanded digital output is adapted to vary its period in accordance with variations of the battery voltage; and
    indicator means for indication of the voltage value of said battery by means of the output of said expanding circuit.

2. A battery-voltage indicator of a camera according to claim 1, said analog-to-digital converter further including switching means for selectively connecting the battery voltage and a reference voltage to the integrator for integration.

3. A battery-voltage indicator of a camera according to claim 2, said analog-to-digital converter further including a comparator connected to said integrator and a latching circuit for latching the counting output of the converter in response to the output of said comparator.

4. A battery-voltage indicator of a camera according to claim 3, wherein said switching means is adapted to firstly connect the battery voltage to said integrator and then the reference voltage to the same at a predetermined counting value of said counter; said reference voltage causing the integrator to integrate down.

5. A battery-voltage indicator of a camera according to claim 4, wherein said latching circuit operates to latch the output counting value of said counter during said integration down of the integrator.

6. A battery-voltage indicator of a camera according to claim 5, wherein said analog-to-digital converter is constituted as a dual-slope integrator A/D converter.

7. A battery-voltage indicator of a camera according to claim 1, wherein said indicator means is constituted as an acoustic device for producing signal sounds which indicates the voltage value of said battery.

8. A battery-voltage indicator of a camera according to claim 7, wherein said digital expanding circuit is adapted to chop an audio frequency signal for actuating said acoustic device by means of the period of the output thereof.

9. A battery-voltage indicator of a camera according to claim 1, wherein said digital expanding circuit includes a pulse forming circuit for producing such pulses that frequency varies in multiple-series and a pulse selecting circuit for selecting pulses with a frequency to be selected, in response to an output of said analog-to-digital converter.

10. A battery-voltage indicator of a camera according to claim 1, wherein said digital expanding circuit, functions as an expanding circuit in a shutter speed controlling circuit.

11. A battery-voltage indicator of a camera according to claim 1, wherein said integrator is commonly used to integrate an output corresponding to shutter time value in the exposure controlling mode.

12. A battery-voltage indicator a camera comprising:
    a battery for use as the power source of circuitry means necessary to photographing operations;
    an acoustic device for audibly indicating voltage variations of said battery with discontinuous sounds which is adapted to vary its interval in accordance with said voltage variations;
    an analog-to-digital converter for converting the analog value of a battery voltage into digital value; and
    circuit means for converting equal difference variations of said digital value of the output signals of said converter into equal ratio variations in order to expand said output signals of converter, wherein said acoustic device is energized by said expanded output signals to indicate the voltage value of the battery.

13. A battery-voltage indicator of a camera comprising:
    a battery, the voltage of which is to be checked;
    said battery for being employed as the power source of circuitry means necessary for a photographing operation;
    an analog-to-digital converter for changing the analog value of a battery voltage into a digital signal and for changing the analog value of the exposure value into a digital value;

an expanding circuit connected to the output of the converter for enlarging the period of the digital output of the converter, wherein said expanded digital output varies its period in accordance with variations of the battery voltage; and indicator means responsive to the output of said expanding circuit for indication of the voltage value of said battery.

14. A battery-voltage indicator of a camera comprising:

a battery, the voltage of which is to be checked;

said battery for being employed as the power source of circuitry means necessary for a photographing operation;

an analog-to-digital converter for changing the analog value of a battery voltage into a digital pulse train signal output, the number of pulses being determined in accordance with the value of the battery voltage;

an expanding circuit connected to the output of the converter for enlarging the period of the digital signal output of the converter, wherein said expanded digital signal output has its period vary in accordance with variations of the battery voltage, wherein said digital expanding circuit operates as an expanding circuit in a shutter speed controlling circuit; and indicator means responsive to the output of said expanding circuit for indication of the voltage value of said battery.

15. A battery-voltage indicator of a camera comprising:

a battery, the voltage of which is to be checked;

said battery for being employed as the power source of circuitry means necessary for a photographing operation;

an analog-to-digital converter for changing the analog value of a battery voltage into a digital pulse train signal output, the number of pulses being determined in accordance with the value of the battery voltage;

an expanding circuit connected to the output of the converter for enlarging the period of the digital signal output of the converter, wherein said digital expanding circuit includes a pulse forming circuit for producing such pulses that frequency varies in multiple-series and a pulse selecting circuit for selecting pulses with a frequency to be selected, in response to an output of said analog-to-digital converter, wherein said expanded digital signal output has its period vary in accordance with variations of the battery voltage; and indicator means responsive to the output of said expanding circuit for indication of the voltage value of said battery.

16. A battery-voltage indicator of a camera comprising:

a battery, the voltage of which is to be checked;

said battery for being employed as the power source of circuitry means necessary for a photographing operation;

an analog-to-digital converter for changing the analog value of a battery voltage into a digital pulse train signal output, the number of pulses being determined in accordance with the value of the battery voltage;

an expanding circuit connected to the output of the converter for enlarging the period of the digital signal output of the converter, wherein said expanded digital signal output has its period vary in accordance with variations of the battery voltage; and indicator means responsive to the output of said expanding circuit for indication of the voltage value of said battery.

* * * * *